UNITED STATES PATENT OFFICE.

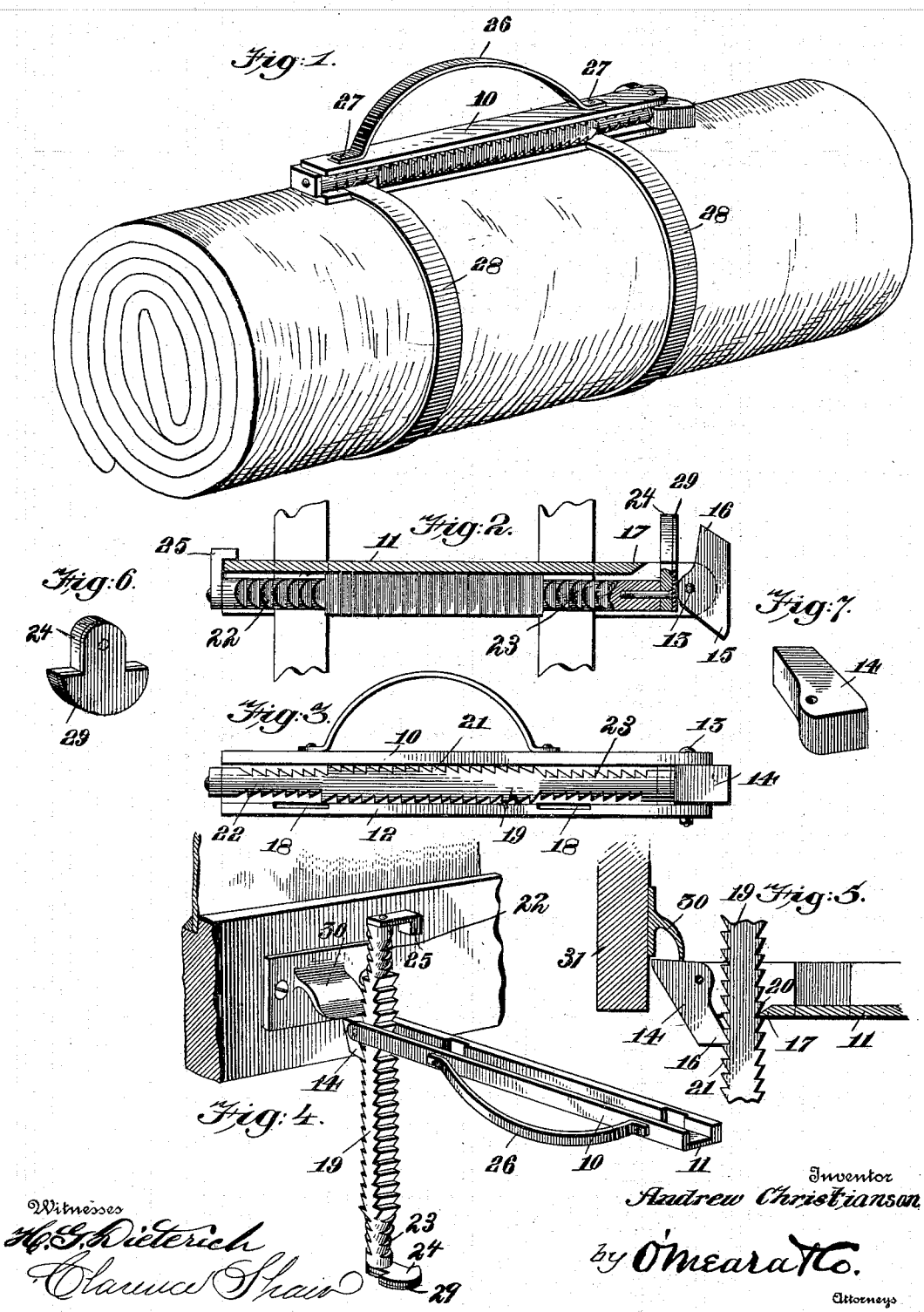

ANDREW CHRISTIANSON, OF GREAT FALLS, MONTANA.

COMBINED WINDOW-JACK AND BUNDLE-CARRIER.

SPECIFICATION forming part of Letters Patent No. 612,128, dated October 11, 1898.

Application filed February 3, 1898. Serial No. 669,031. (No model.)

*To all whom it may concern:*

Be it known that I, ANDREW CHRISTIANSON, residing at Great Falls, in the county of Cascade and State of Montana, have invented a new and useful Combined Window-Jack and Bundle-Carrier, of which the following is a specification.

My invention relates to jacks for car-windows, the object being to provide a device of this class which, while serving all the purposes of a jack to raise a car-window to a sufficient height to permit the insertion of the fingers under the sash, is so constructed as to serve also as a bundle-carrier or shawl-strap frame.

It is a fact well known to the traveling public that it is usually difficult to raise the window-sashes of the cars, more especially when the wood of the sash and frame is swelled by dampness or when, as in an old car, the window-frame is out of true. Further than this, the window-sashes are liable to stick at the bottom, rendering it impossible to start them. The difficulty in starting the sashes up is the main one, and to obviate this I have provided the present invention, which consists in a jack comprising a toothed bar, a lever, and a dog adapted to rest under the finger-lift of the sash, whereby the sash may be raised to a sufficient height to permit the insertion of the fingers under it, such lifting-jack being arranged to fold into a compact form, when it serves the additional purpose of a handle for a shawl-strap or bundle-carrier.

In order to enable others skilled in the art to which my invention most nearly appertains to make and use the same, I will now proceed to describe its construction and operation, reference being had to the accompanying drawings, forming part of this specification, in which—

Figure 1 is a perspective view illustrating my invention applied to use as the handle of a shawl-strap or bundle-carrier. Fig. 2 is a longitudinal section through the device, on an enlarged scale, when applied to the same use as in Fig. 1. Fig. 3 is a side elevation of the same. Fig. 4 is a detail perspective view illustrating my invention when in use as a window-jack. Fig. 5 is a detail sectional view of the same. Fig. 6 is a detail perspective view of the foot of the toothed bar. Fig. 7 is a detail perspective view of the dog.

Like numerals of reference mark the same parts wherever they occur in the various figures of the drawings.

Referring to the drawings by numerals, 10 is the top, 11 the side, and 12 the bottom, of the main body or case of my apparatus, the fourth side being omitted, so that the body or case is in the form of a rectangular tubular structure open on one side. The top and bottom 10 and 12 project at one end beyond the side 11, and in these projecting ends is pivoted, by means of a small bolt 13, a dog 14, provided with a beveled tooth 15 on the outer edge of one end and a similar tooth 16 at the inner edge of the other end. The side 11 is constructed to form a beveled tooth 17. The bottom 12 is transversely grooved, as at 18.

19 indicates a bar provided with teeth 20 on one side and teeth 21 on the opposite side for its whole length, the central portion of the bar being rectangular in section to neatly fit within the case, while its outer ends, as at 22 and 23, are made cylindrical for purposes hereinafter explained.

At one end of the toothed bar 19 is pivotally secured a foot-piece 24, while at the opposite end is pivotally secured a hook 25. 26 indicates a strap or metallic bow secured by rivets 27 to the top 10 of the frame of my apparatus.

28 indicates straps, illustrated in Fig. 1 as passing through the grooves 18 in the bottom 12. The foot-piece 24 is provided on its under surface with a cushion 29, of rubber, leather, or other like suitable material.

The construction of my invention will be readily understood from the foregoing description, and its operation may be described as follows:

When the apparatus is to be used as a window-jack, it is adjusted to bring the parts into the relative positions shown in Fig. 4, in which it will be noticed that the upper outer tooth 15 of the dog 14 is engaged under the finger-lift 30, attached to a window-sash 31, the toothed bar 19 being vertically located just inside of the window-sash, with the foot 24 resting upon the sill 32 of the window. It will be further observed that the inner lower tooth 16 of the dog 14 is engaged with one of the teeth 21 of the bar 19, and the beveled tooth 17 on the end of the side 11 of the frame is engaged with one of the teeth 20 of said bar. By pressing downward upon the body or frame as a lever the tooth 17 of the side 11, resting on the tooth 20, becomes the fulcrum, and the dog 14 is carried upward until its tooth 16 engages in the next upper tooth 21 of the bar 19, carrying the window-sash with it. With the tooth 16 acting as a fulcrum by raising the frame the tooth 17 will engage the next upper tooth 20, thus making a new fulcrum for the tooth 17, whereby the dog can be raised another step, carrying the window-sash with it. This operation is repeated until the upper end of the bar is reached, which upper end, as before described, being circular, the bar 19 may be turned so as to bring its smooth side outward, when it can be drawn through between the tooth 16 of the dog 14 and the tooth 17 of the side 11 of the frame, said teeth passing freely over the smooth surfaces. Having been moved lengthwise until the space between the tooth 17 and the end of the top and bottom 10 and 12 is reached, the bar may then be folded into the casing, after which the hook 25 may be engaged with the side 11 by pressing the bar in the opposite direction, thus retaining the bar in position.

In opening the device for use as a window-jack the dog 14 may be used as a lever to press the toothed bar longitudinally in order to release the hook 25 from the side 11. In this operation the top of the dog is pressed against the outer side of the foot 29, as specially illustrated in Fig. 2, by drawing the tooth 16 outward, the result being a longitudinal movement of the bar sufficient to release the hook 25 from engagement with the side 11, so that the parts may be turned into the desired positions.

For use as a handle of a shawl-strap or bundle-carrier it is only necessary to slip straps 28 through the grooves 18, when such straps may be secured around the bundle or package in any well-known manner, such as by buckles, hooks, &c.

While I have illustrated and described the best means now known to me for carrying out my invention, I do not wish to be understood as restricting myself to the exact construction shown, but hold that any slight changes, such as might suggest themselves to the ordinary mechanic, would properly fall within the limit and scope of my invention.

Having thus fully described my invention, what I claim as new, and desire to secure by Letters Patent of the United States, is—

1. A combined window-jack and shawl-strap handle, comprising a casing consisting of a top, bottom and one side, the bottom being grooved transversely to receive the shawl-straps, the top being provided with a bow or handle, the side being formed with a beveled tooth at one end and the top and bottom being extended beyond the side at one end, a dog pivoted between the extended ends of the top and bottom and provided with a beveled tooth at the outer edge of its top and a similar beveled tooth at the inner edge of its bottom, and a bar, toothed on both sides, the teeth on one side being adapted, when used as a window-jack, to engage with the tooth on the end of the side of the casing, and the teeth on the other side being adapted to engage the lower, inner tooth of the dog, substantially as described.

2. The combination with the casing, consisting of the top and bottom 10 and 12 and side 11, the top and bottom being extended beyond the side at one end, of the dog, 14, pivoted between the projecting ends of the top and bottom and provided with an outer, upper tooth and a lower, inner tooth, a bar, toothed on both sides, the central portion being rectangular and the end portions circular in cross-section, said bar being adapted to fit within the casing or to be moved longitudinally of the bar in the space between the end of the side of the casing and the dog, a retaining-foot swiveled on one end of the toothed bar, and a securing-hook swiveled on the opposite end of the toothed bar, substantially as described.

ANDREW CHRISTIANSON.

Witnesses:
GEO. H. GORHAM,
EVA H. RACE.